(12) United States Patent
Mori et al.

(10) Patent No.: US 8,755,170 B2
(45) Date of Patent: Jun. 17, 2014

(54) METAL ELECTROLYTIC CAPACITOR, AND ABSORBENT AND LEAKAGE PREVENTION MATERIAL FOR METAL ELECTROLYTIC CAPACITOR

(75) Inventors: Koichi Mori, Tokyo (JP); Mitsuru Nozue, Tokyo (JP); Minoru Yagi, Tokyo (JP)

(73) Assignee: Kurita Water Industries Ltd., Tokyo (JP)

( * ) Notice: Subject to any disclaimer, the term of this patent is extended or adjusted under 35 U.S.C. 154(b) by 243 days.

(21) Appl. No.: 13/375,240

(22) PCT Filed: Jun. 2, 2010

(86) PCT No.: PCT/JP2010/059342
§ 371 (c)(1),
(2), (4) Date: Feb. 14, 2012

(87) PCT Pub. No.: WO2010/140618
PCT Pub. Date: Dec. 9, 2010

(65) Prior Publication Data
US 2012/0127633 A1    May 24, 2012

(30) Foreign Application Priority Data

Jun. 2, 2009 (JP) ................. 2009-132938
Jun. 2, 2009 (JP) ................. 2009-132939
Jun. 23, 2009 (JP) ................. 2009-148622
Jun. 23, 2009 (JP) ................. 2009-148623

(51) Int. Cl.
*H01G 9/00* (2006.01)
*H01M 2/12* (2006.01)

(52) U.S. Cl.
USPC ........................ 361/502; 361/521

(58) Field of Classification Search
USPC ................................. 361/502, 521
See application file for complete search history.

(56) References Cited

U.S. PATENT DOCUMENTS

| 7,393,505 | B2 | 7/2008 | Inoue et al. |
| 2005/0153841 | A1 | 7/2005 | Bunt et al. |

(Continued)

FOREIGN PATENT DOCUMENTS

| CN | 1672042 | 9/2005 |
| JP | 04-33322 A | 2/1992 |

(Continued)

OTHER PUBLICATIONS

Office Action dated Aug. 27, 2013 issued in corresponding JP patent application No. 2009-132938.

(Continued)

*Primary Examiner* — Jayprakash N Gandhi
*Assistant Examiner* — Dion Ferguson
(74) *Attorney, Agent, or Firm* — Posz Law Group, PLC (57) ABSTRACT

A metal electrolytic capacitor capable of quickly absorbing and immobilizing a belching vapor of a driving electrolyte and widely reducing leakage when an explosion-proof valve operates. An aluminum electrolytic capacitor body is configured by housing a capacitor element in a cylindrical aluminum case, a pair of leads extend from the capacitor body, an explosion-proof valve. is formed on a top panel portion of the metal case, a cylindrical cap as a casing is attached from above to the capacitor body, a plurality of small openings are formed on a top panel portion (bottom portion) of the cap, and an absorbent or a mixture of an absorbent and a water molecular compound wrapped in a permeable fiber material, such as unwoven fabric and filter paper, is placed in a space between the cap and the top panel portion of the capacitor body.

18 Claims, 1 Drawing Sheet

(56) References Cited

U.S. PATENT DOCUMENTS

2005/0250893 A1    11/2005    Ballijepalli et al.
2006/0120924 A1    6/2006     Inoue et al.

FOREIGN PATENT DOCUMENTS

| JP | 04033318   | * | 2/1992  | ............... H01G 9/12 |
| JP | 04033319   | * | 2/1992  | ............... H01G 9/12 |
| JP | 04033320   | * | 2/1992  | ............... H01G 9/12 |
| JP | 04033323   | * | 2/1992  | ............... H01G 9/12 |
| JP | A-H04-033321 |  | 2/1992 | |
| JP | 04-148523  | * | 5/1992  | ............... H01G 9/12 |
| JP | 05-13289 A |   | 1/1993  | |
| JP | 06-89835 A |   | 3/1994  | |
| JP | 07-228537 A |  | 8/1995  | |
| JP | 2001-115139 A | | 4/2001 | |
| JP | 2006-286969 A | | 10/2006 | |

OTHER PUBLICATIONS

Office Action dated Aug. 27, 2013 issued in corresponding JP patent application No. 2009-148622.

International Search Report mailed on Aug. 10, 2010 for the corresponding International patent application No. PCT/JP2010/059342.

Office Action mailed Feb. 5, 2013 in corresponding CN Application No. 201080023238.6.

* cited by examiner

Fig.3

METAL ELECTROLYTIC CAPACITOR, AND ABSORBENT AND LEAKAGE PREVENTION MATERIAL FOR METAL ELECTROLYTIC CAPACITOR

CROSS REFERENCE TO RELATED APPLICATIONS

This application is a U.S. national stage application of PCT/JP2010/059342 filed on Jun. 2, 2010, and claims priority to, and incorporates by reference, Japanese Patent Applications No. 2009-132938 filed on Jun. 2, 2009, No. 2009-132939 filed on Jun. 2, 2009, No. 2009-148622 filed on Jun. 23, 2009 and No. 2009-148623 filed on Jun. 23, 2009.

TECHNICAL FIELD

The present invention relates to a metal-made electrolytic capacitor used for electronic devices, etc. and particularly relates to a metal-made electrolytic capacitor provided with an explosion-proof valve for preventing explosion caused by an internal pressure rise. The present invention also relates to an absorbent and leakage prevention material for a driving electrolyte of a metal-made electrolytic capacitor used for electronic devices, etc. and particularly relates to an absorbent and leakage prevention material for an electrolytic capacitor which can prevent explosion when a driving electrolyte evaporates to raise the internal pressure of a metal-made electrolytic capacitor in an abnormal case.

BACKGROUND ART

In an aluminum electrolytic capacitor, when an excess voltage or reverse voltage is applied or when an excess current flows due to longevity or failures, etc., an organic solvent composing a driving electrolyte impregnated in a capacitor element evaporates or the electrolyte is pyrolyzed (thermally decomposed) to generate a vapor due to a temperature rise, or the electrolyte is decomposed by an electrochemical reaction to generate a hydrogen gas or vapor, consequently, an internal pressure rises inside a metal case made by aluminum.

At this point, when there is no way out for the gases, an explosion is caused as a result that the internal pressure of the metal case surpasses a sealing force of the metal case. Therefore, in a conventional aluminum electrolytic capacitor, an explosion-proof valve formed by a thin portion is normally provided on a top panel of its metal case.

As explained above, when the internal pressures of the metal case rises abnormally, the explosion-proof valve opens and a gas of an organic solvent and a hydrogen gas composing the driving electrolyte in the metal case explained above flow out, so that it safely results in a failure without an explosion of the electrolytic capacitor.

According to the configuration above, however, there is a disadvantage that the driving electrolyte flows to the outside and adheres to the substrate, on which the electrolytic capacitor is set, and other electronic devices, and short-circuiting, tracking and other electric abnormalities are caused. Also, a vapor and a foreign odor of the driving electrolyte belching from the explosion-proof valve may possibly give the user a false idea that it is due to some ignition.

As a countermeasure of the above disadvantage, an electrolytic capacitor attached with an extensible cap has been proposed (refer to the patent document 1). Also, an aluminum electrolytic capacitor having an absorbent, which has a property of absorbing a driving electrolyte and breathabililiy, finished with a flame-retardant treatment, provided above an explosion-proof valve of the electrolytic capacitor has been proposed (refer to the patent document 2). Furthermore, an aluminum electrolytic capacitor having a granular gelator having a behavior of turning the driving electrolyte into gel provided above an explosion-proof valve has been proposed (refer to the patent document 3).

PRIOR ART REFERENCE

Patent Documents

[Patent Document 1] The Japanese Patent Publication (Kokai) No. 2006-286969
[Patent Document 2] The Japanese Patent Publication (Kokai) No. H06-89835
[Patent Document 3] The Japanese Patent Publication (Kokai) No. H05-13289

SUMMARY OF THE INVENTION

Object to be Achieved by the Invention

However, the electrolytic capacitor described in the patent document 1 has a disadvantage because it is simply provided with an extensible cap to provide a space for absorbing a vapor of a driving electrolyte or a hydrogen gas and it cannot accommodate a sufficient amount of gas and the internal pressure inside the cap rises to result in damages in some cases, and the driving electrolyte returns to a liquid (devolatilized) after cooling, therefore, there is a possibility of leaking.

Also, an absorbent of a driving electrolyte in an electrolytic capacitor described in the patent documents 2 and 3 is to immobilize a vapor of the driving electrolyte by absorbing or gelating. However, the absorbing speed or gelating speed of a vapor is not sufficiently fast, so that absorption of gases becomes too late in some cases depending on an amount of belching gas. Also, there is a problem that it is not suitable to absorbing a hydrogen gas, etc.

In consideration of the matters mentioned above, an object of the present invention is to provide a metal electrolytic capacitor, which can widely reduce a leakage of a driving electrolyte, etc. by quickly absorbing and immobilizing belching vapor, etc. of the driving electrolyte when an explosion-proof valve operates.

Another object of the present invention is to provide an absorbent and a leakage prevention material for a metal electrolytic capacitor, which can widely reduce a leakage of a driving electrolyte, etc. by quickly absorbing and immobilizing belching vapor, etc. of the driving electrolyte when an explosion-proof valve operates.

Means for Achieving the Object

As a countermeasure to the above disadvantage, there is provided an absorbent for a metal electrolytic capacitor, for absorbing a driving electrolyte in the case of electric abnormality of the metal electrolytic capacitor comprising a capacitor element impregnated with a driving electrolyte, a metal case having a cylindrical shape with a bottom for housing the capacitor element, and a pair of leads coming out from the capacitor element, wherein the absorbent reduces belch amount of a driving electrolyte, etc. by forming a molecular compound with the driving electrolyte (Invention 1).

In a metal electrolytic capacitor, when an excess voltage or reverse voltage is applied or when an excess current flows due to longevity or failures, etc., an organic solvent composing a driving electrolyte impregnated in a capacitor element evaporates or the electrolyte is pyrolyzed (thermally decomposed) to generate a vapor due to a temperature rise, or the electrolyte is decomposed by an electrochemical reaction to generate a hydrogen gas or vapor. And when an internal pressure rises inside a metal case thereby, an explosion-proof valve provided on a top panel portion of the metal case operates and a large amount of driving electrolyte and a large amount of gases, such as hydrogen, belch from the explosion-proof valve. However, according to the invention above (Invention 1), an absorbent forms a molecular compound with the driving electrolyte and a reaction of forming the molecular compound is quick, so that the vapor of the driving electrolyte can be immobilized quickly. Accordingly, by providing the absorbent above the explosion-proof valve provided on the top panel portion of the metal case, the driving electrolyte, etc. can be quickly absorbed and held by the absorbent, and an outflow of the evaporated driving electrolyte to the outside can be widely reduced.

In the invention above (Invention 1), preferably, the absorbent is an organic-type, inorganic-type, or an organic and inorganic composite-type material (Invention 2). Particularly preferably, the absorbent is an inorganic porous material (Invention 3).

Also, according to the present invention, there is provided a leakage prevention material for a metal electrolytic capacitor, for absorbing a driving electrolyte in the case of an electric abnormality of the metal electrolytic capacitor comprising a capacitor element impregnated with a driving electrolyte, a metal case having a cylindrical shape with a bottom for housing the capacitor element, and a pair of leads coming out from the capacitor element; wherein the leakage prevention material is composed of the absorbent explained above (Inventions 1 to 3) and a substance impregnated with water (Invention 4).

According to the invention above (Invention 4), the leakage prevention material is composed of the absorbent according to the inventions above (Inventions 1 to 3) and a substance impregnated with water, and a reaction of forming a molecular compound by the absorbent is quick, so that a vapor of a driving electrolyte can be absorbed and held quickly. Furthermore, although an evaporated driving electrolyte becomes 150° C. or higher, because a substance impregnated with water is contained together with the absorbent, the substance impregnated with water draws a vaporization heat from the driving electrolyte so that it is possible to lower the temperature of the belched substances and devolatilize them. Thereby, a volume of the belched substance amount can be reduced. Accordingly, by providing the leakage prevention material above the explosion-proof valve provided on the top panel of the metal case, the driving electrolyte can be quickly absorbed and held by the absorbent and an overflow of the evaporated driving electrolyte to the outside can be reduced widely.

In the invention above (Invention 4), preferably, the substance impregnated with water is a water molecular compound (Invention 5). According to the invention (Invention 5), as a result of using a water molecular compound, such as hydrates, as the substance impregnated with water, it is possible to place water as a solid substance together with the absorbent and, by lowering a temperature of substances belched from the capacitor by drawing the vaporization heat with water, the belched substance amount can be reduced.

Furthermore, according to the present invention, there is provided a metal electrolytic capacitor, comprising a capacitor element impregnated with a driving electrolyte, a metal case having a cylindrical shape with a bottom for housing the capacitor element, and a pair of leads coming out from the capacitor element: wherein an explosion-proof valve is formed on a top panel portion of the metal case, and the explosion prevention vale opens in the case of an electricity abnormality to belch a driving electrolyte; and an absorbent for absorbing the driving electrolyte is provided above the explosion-proof valve (Invention 6).

According to the invention above (Invention 6), since an absorbent capable of absorbing a driving electrolyte, etc. is placed above the explosion-proof valve provided on the top panel portion of the metal case, it is absorbed and held quickly by the absorbent and an overflow of the evaporated driving electrolyte to the outside can be reduced widely.

In the invention above (Invention 6), preferably, the absorbent is provided inside a casing attached above the explosion-proof valve (Invention 7). According to the invention (Invention 7), as a result that gases, such as a vapor of the driving electrolyte and a hydrogen gas, belched from the explosion-proof valve are contained in the casing, an overflow of the evaporated driving electrolyte to the outside can be furthermore reduced.

In the invention above (Invention 7), preferably, a small opening for reducing an internal pressure rise associated with belch of a driving electrolyte, etc. is formed on the casing (Invention 8).

According to the invention above (Invention 8), when gases, such as a vapor of the driving electrolyte and hydrogen belched from the explosion-proof valve, are contained in the casing, they are exhausted by bits from the small opening(s) when an internal pressure in the casing excesses a predetermined pressure, therefore, it is possible to prevent damages caused by an excessive pressure in the casing and to prevent the casing from coming off from the metal case.

In the invention above (Invention 6), preferably, the absorbent is the absorbent according to the inventions above (Inventions 1 to 3) (Invention 9). According to the invention (Invention 9), because a reaction of forming a molecular compound with the driving electrolyte is quick, it is possible to immobilize a vapor of the driving electrolyte quickly and suppress an outflow to the outside suitably.

In the invention above (Invention 6), preferably, a substance impregnated with water is furthermore provided above the explosion-proof valve (Invention 10). According to the invention (Invention 10), since the absorbent of the driving electrolyte, etc. is placed above the explosion-proof valve provided on the top panel of the metal case, they can be absorbed and held quickly by the absorbent. Furthermore, although an evaporated driving electrolyte becomes 150° C. or higher, because a substance impregnated with water is contained together with the absorbent, the substance impregnated with water draws a vaporization heat from the driving electrolyte so that it is possible to lower the temperature of the belched substances and devolatilize them. Thereby, a volume of the belched substance amount can be reduced. In this way, according to the invention (Invention 10), an overflow amount of an evaporated driving electrolyte to the outside can be reduced widely.

In the invention above (Invention 10), preferably, the absorbent and substance impregnated with water are provided inside a casing attached above the explosion-proof valve (Invention 11).

According to the invention above (Invention 11), gases, such as a vapor of the driving electrolyte and hydrogen belched from the explosion-proof valve, are contained in the casing, and a devolatilized driving electrolyte as a result that a vaporization heat is drawn by water of the substance impregnated with water is contained in the casing, consequently, an overflow of the driving electrolyte to the outside can be furthermore reduced.

In the above invention (Invention 11), preferably, a small opening for reducing an internal pressure rise associated with belch of a driving electrolyte, etc. is formed on the casing (Invention 11).

According to the invention above (Invention 12), when gases, such as a vapor of the driving electrolyte and hydrogen, belched from the explosion-proof valve are contained in the casing, they are exhausted from the small opening(s) if an internal pressure of the casing excesses a predetermined pressure, therefore, it is possible to prevent damages caused by an excessive pressure in the casing and to prevent the casing from coming off from the metal case.

In the invention above (Invention 10), preferably, the absorbent is the absorbent according to the inventions above (Inventions 1 to 3) (Invention 13). According to the invention (Invention 13), a reaction of forming a molecular compound with the driving electrolyte is quick, therefore, a vapor of the driving electrolyte can be immobilized quickly and an outflow to the outside can be suppressed suitably.

In the invention above (Invention 10), preferably, the substance impregnated with water is a water molecular compound (Invention 14). According to the invention (Invention 14), by using a water molecular compound, such as hydrates, as the substance impregnated with water, water can be placed as a solid substance together with an absorbent. And a vaporization heat is drawn by the water and a temperature of the belched substances falls, so that an amount of the belched substances can be reduced.

Effects of the Invention

According to the absorbent for a metal electrolytic capacitor of the present invention, the absorbent forms a molecular compound with a driving electrolyte, and a reaction of forming this molecular compound is so quick that a vapor of the driving electrolyte can be immobilized quickly. Therefore, by providing this absorbent, for example, above an explosion-proof valve provided on a top panel of a metal case, a driving electrolyte, etc. can be quickly absorbed and held by the absorbent, so that an overflow of the evaporated driving electrolyte to the outside can be reduced widely. By using the absorbance for a metal electrolytic capacitor of the present invention, it is possible to obtain a metal electrolytic capacitor, which does not contaminate a circuit board and is suitable for a variety of electric devices and electronic devices.

Also, according to the leakage prevention material for a metal electrolytic capacitor of the present invention, the leakage prevention material is composed of an absorbent, which forms a molecular compound with a driving electrolyte and reduces a belching amount of the driving electrolyte, etc., and a substance impregnated with water; and the absorbent forms a molecular compound with the driving electrolyte quickly, so that it is possible to quickly absorb and hold a vapor of the driving electrolyte. Furthermore, although an evaporated driving electrolyte becomes a temperature of 150° C. or higher, since a substance impregnated with water is provided together with the absorbent, the temperature of the belched substance can be lowered and it can be devolatilized as a result of taking a vaporization heat from the evaporated driving electrolyte. Consequently, a volume of the belched substance can be reduced. In this way, an overflow amount of the driving electrolyte to the outside can be reduced widely. Accordingly, by providing the leakage prevention material to above the explosion-proof valve provided on the top panel portion of a metal case, a driving electrolyte, etc. can be quickly absorbed and held by the absorbent. By using the absorbent for a metal electrolytic capacitor of the present invention, a metal electrolytic capacitor, which does not contaminate a circuit board and is suitable to a variety of electric devices and electronic devices, can be obtained.

Furthermore, according to the metal electrolytic capacitor of the present invention, because an absorbent for absorbing a driving electrolyte, etc. is arranged above an explosion-proof valve provided on a top panel of a metal case, even if an organic solvent composing the driving electrolyte is evaporated or a hydrogen gas arises by an electric chemical reaction to result in belching, they can be quickly absorbed and held by the absorbent and the evaporated driving electrolyte belching to the outside can be reduced widely. Furthermore, although the evaporated driving electrolyte becomes a temperature of 150° C. or higher, because a substance impregnated with water is provided together with the absorbent, a vaporization heat is drawn from the evaporated driving electrolyte and the temperature of the belched substance falls to result in devolatilization. Consequently, a volume of the belched substances can be reduced. A metal electrolytic capacitor of the present invention as such does not contaminate a circuit board and is suitably used for a variety of electric devices and electronic devices.

MODE FOR CARRYING OUT THE INVENTION

Absorbent for Metal Electrolytic Capacitor

An absorbent for a metal electrolytic capacitor of the present invention forms a molecular compound with a driving electrolyte and hydrogen gas, etc. Here, a molecular compound is a compound wherein two or more kinds of compounds, each can stably present alone, are bonded by a relatively weak interaction represented by hydrogen bonding and a van der Waals force, etc. other than covelent bonding; and hydrates, solvates, adducts and clathrates, etc. are included. Such molecular compounds can be formed by a contact reaction between a compound forming a molecular compound and substances belched from an aluminum electrolytic capacitor and, thereby, the belched substances can be transformed into solid compounds.

As a molecular compound as explained above, clathrates, wherein the belched substances as guest compounds are contained in the host compound, may be mentioned, which is obtained from the contact reaction of a host compound and the belched substances, such as a driving electrolyte, from the capacitor body.

Among molecular compounds, as a host compound to form a clathrate comprising belched substances, such as a driving electrolyte, those composed of organic compounds, inorganic compounds and organic and inorganic composite compounds are known. As to organic compounds, monomolecular-type, multimolecular-type and polymer-type hosts, etc. are known.

As a monomolecular-type host, cyclodextrins, crown ethers, cryptands, cyclophanes, azacyclophanes, calixarenes, cyclotriveratrylenes, spherands, cyclic olygopeptides, etc. may be mentioned.

As a multimolecular-type host, ureas, thioureas, deoxycholic acids, cholic acids, perhydro-triphenylenes, tri-o-thymotides, bianthryls, spirobifluorenes, cyclophosphazenes, monoalcohols, diols, hydroxybenzophenones, acetylene alcohols, phenols, bisphenols, trisphenols, tetrakisphenols, polyphenols, naphthols, bisnaphthols, diphenyl methanols, carbonic acid amides, thioamides, bixanthenes, carbonic acids, imidazoles, and hydroquinones, etc. may be mentioned.

Furthermore, as a polymer-type host, chitins, chitosans, polyethylene glycol armed polymers having 1,1,2,2-tetrakisphenylethane as a core, polyethylene glycol armed polymers having $\alpha,\alpha,\alpha',\alpha'$-tetrakisphenylxylene as a core, etc. may be mentioned.

Furthermore, other than the above, organic phosphorous compounds and organosilicon compounds, etc. may be also mentioned.

As an inorganic-type host compound, a titanium oxide, graphite, alumina, transition metal dichalcogenite, lanthanum fluorides, clay minerals (montmorillonite, etc.), silver salt, silicate, phosphate, zeolite, a magnesium oxide, silica, porous glass, etc. may be mentioned. Particularly, inorganic porous-type materials being porous are effective and porous materials, such as silica, calcium silicate, magnesium aluminometasilicate, alumina, zeolite, magnesium oxide, magnesium silicate and aluminum silicate, are preferable.

Furthermore, some of organic metal compounds exhibit properties as a host compound and, for example, organic aluminum compound, organic titanium compound, organic boron compound, organic zinc compound, organic indium compound, organic gallium compound, organic tellurium compound, organic tin compound, organic zirconium compound, and organic magnesium compound, etc. may be mentioned. It is also possible to use a metal salt of organic carboxylic acid and organic metal complexes, etc., but as long as it is an organic metal compound, it is not particularly limited to these.

These host compounds may be used as one kind alone or two or more kinds together as an absorbent. Specifically, as a solvent for a driving electrolyte, ethylene glycol, methyl cellosolve (ethylene glycol monomethyl ether), γ-butyrolactone, N-methylformamide, N-methyl-2-pyrrolidone, acetonitrile, dimethyl sulfoxide, propylene carbonate, etc. are used. Therefore, as an absorbent, it is preferable to use a polymorphic absorbent, meaning one absorbent is capable of including a plurality of solvents. For example, α-cyclodextrin, β-cyclodextrin and other cyclodextrins; calixarenes; urea, deoxycholic acid, cholic acid, 1,1,6,6-tetraphenylhexa-2,4-diyne-1,6-diol and other acetylene alcohols; 1,1-bis(4-hydroxyphenyl)cyclohexane and other bisphenols; 1,1,2,2-tetrakis(4-hydroxyphenyl)ethane and other tetrakisphenols; bis-β-naphthol and other naphthols; bis(dicyclohexylamide) diphenate and other carboxylic amides; 2,5-di-t-butylhydroquinone and other hydroquinones; chitin, chitosan, silica, calcium silicate, magnesium aluminometasilicate, alumina, zeolite, magnesium oxide, magnesium silicate, aluminum silicate and organic metal compounds, etc. are preferable.

[Leakage Prevention Material for Metal Electrolytic Capacitor]

The leakage prevention material for a metal electrolytic capacitor of the present invention is composed of an absorbent and a substance impregnated with water. An absorbent composing a leakage prevention material as such is to form a molecular compound with a driving electrolyte and a hydrogen gas, etc. and may be the same as the absorbent for a metal electrolytic capacitor explained above.

As a substance impregnated with water composing the leakage prevention material, a porous substance impregnated with water; water molecular compounds, such as magnesium sulfate.$7H_2O$, iron(II) sulfate.$7H_2O$, iron(III).$nH_2O$, potassium alum.$12H_2O$, sodium alum.$12H_2O$, aluminum sulfate.$16H_2O$, nickel sulfate.$6H_2O$, manganese sulfate.$5H_2O$, magnesium phosphate.$8H_2O$, iron(II) phosphate.$8H_2O$ and other inorganic hydrates; and magnesium acetate.$4H_2O$, magnesium citrate.$9H_2O$ and other organic hydrates; and water clathrates, such as cyclodextrin, wherein water is included in a host compound; etc. may be used. Among them, inorganic hydrates and organic hydrates are particularly preferable.

In the leakage prevention material composed of an absorbent and the substance impregnated with water as above, a mixing ratio of the two may be 10 to 500 part by weights of the substance impregnated with water with respect to 10 to 500 parts by weight of the absorbent.

[Metal Electrolytic Capacitor]

Figure 1:
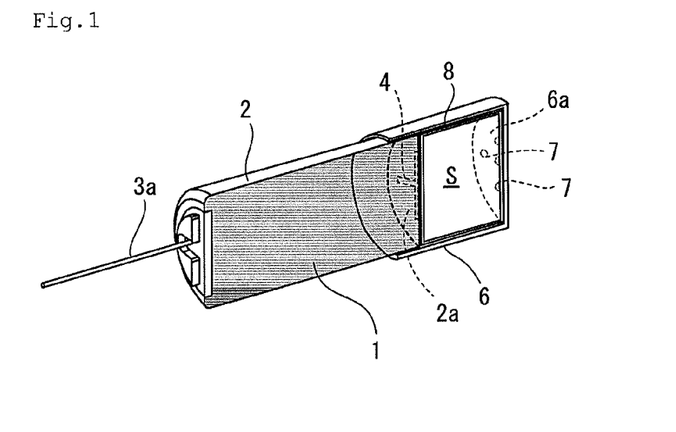
FIG. 1 is a partially notched perspective view showing a metal electrolytic capacitor according to an embodiment of the present invention.
Figure 2:
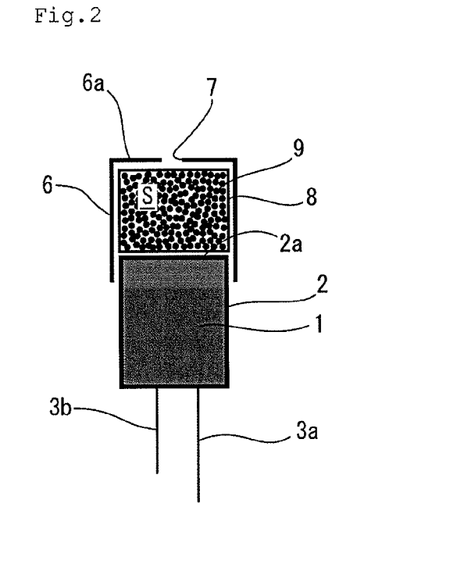
FIG. 2 is a longitudinal sectional view showing the metal electrolytic capacitor according to the same embodiment.
Figure 3:
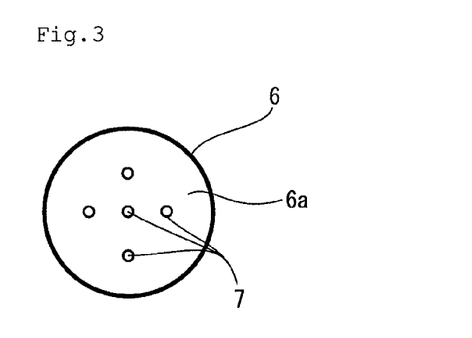
FIG. 3 is a plan view showing the metal electrolytic capacitor according to the same embodiment.

Next, an explanation will be made on an absorbent for a metal electrolytic capacitor of the present invention with reference to the attached drawings based on an example of a metal electrolytic capacitor, wherein the absorbent for a metal electrolytic capacitor can be applied suitably. FIG. 1 to FIG. 3 show a metal electrolytic capacitor according to an embodiment of the present invention.

In FIG. 1 to FIG. 3, the reference number 1 indicates an aluminum electrolytic capacitor body, and the capacitor body 1 has a configuration that a capacitor element is housed in an aluminum metal case 2 having a cylindrical shape with a bottom. The capacitor element is configured by forming a dielectric oxide coating on a surface of an anodic foil made by an aluminum foil having a rough surface and winding the anodic foil and a cathodic foil along with a separator, and the capacitor element is impregnated with a driving electrolyte. Also, a pair of leads 3a and 3b is coming out from the capacitor element. Note that, in the present embodiment, an explosion-proof valve 4 formed by an approximate cross-shaped thin portion is formed on a top panel portion 2a of the metal case 2. This explosion-proof valve 4 may be formed by a thin portion having a variety of shapes, such as an approximate K-shape, approximate Y-shape, approximate X-shape, approximate T-shape and approximate V shape.

A cap 6 having a cylindrical shape with a bottom as a casing is attached from above to the capacitor body 1. The cap 6 is not particularly limited as long as it is not decomposed at a temperature, at which a driving electrolyte as a content of the capacitor body 1 belches in the case of an electric abnormality. For example, the same aluminum alloy as the metal case 2 may be used.

On the top panel portion (the bottom portion) 6a has a plurality of small openings 7, 7, . . . formed thereon, and a space S between the cap 6 and the top panel portion 2a of the capacitor body 1 is provided with the absorbent or leakage prevention material 9 explained above wrapped in a permeable fiber material 8, such as nonwoven fabric and a filter paper.

A size of the cap 6 is preferably as small as possible because when it is too big with respect to the capacitor body 1, the capacitor itself becomes too big and the commodity value declines in terms of standard and design. However, it depends on an amount of the absorbent 9 (an absorbing amount) or an amount of the leakage prevention material 9.

Accordingly, an amount of necessary absorbent 9 or an amount of necessary absorbent and water molecular compound are calculated from a belched amount of a driving electrolyte belching from the capacitor body 1 and an absorbing capability of the absorbent 9 and, based thereon, an amount of the absorbent 9 or the leakage prevention material 9 may be determined. Specifically, the absorbent 9 may be 10 to 500 parts by weight and the leakage prevention material 9 may be 10 to 500 parts by weight with respect to 100 parts by weight of a driving electrolyte, belching from the capacitor body 1. Note that, in FIG. 1, illustration of the absorbent or leakage prevention material 9 are omitted for convenience.

An operation of a metal electrolytic capacitor configured as above will be explained. When an aluminum electrolytic capacitor body 1 is applied with an excess voltage or reverse voltage, the capacitor element inside the capacitor body 1 produces heat, and the driving electrolyte is evaporated due to the heat so as to generate a gas, such as hydrogen, and raise an internal pressure of the metal case 2.

The rise of the internal pressure activates the explosion-proof valve 4 formed on the top panel portion 2a of the metal case 2, and a large amount of evaporated driving electrolyte and gases, such as hydrogen, belches from the explosion-proof valve 4 to the space S. Then, most of the evaporated driving electrolyte is absorbed by the absorbent 9 or the absorbent in the leakage prevention material 9 and immobilized.

Along therewith, the evaporated driving electrolyte becomes 150° C. or higher, however, when the leakage prevention material 9 is provided in the space S of the cap 6, the water molecular compound in the leakage prevention material 9 draws a vaporization heat from the evaporated driving electrolyte so as to lower the temperature of the belched substances and devolatilize them. Therefore, a volume of the belched substances can be reduced.

On the other hand, because an internal pressure inside the cap 6 rises due to the belched substances, it is necessary to make the cap 6 bigger or make a wall thickness of the cap 6 thicker to attain complete tolerability against the internal pressure.

In the present embodiment, however, because a plurality of small openings 7, 7, . . . are formed on the top panel portion 6a of the cap 6, it is configured to slightly belch the evaporated driving electrolyte as the internal pressure of the cap 6 becomes excessively greater.

In this way, an overflow of the evaporated driving electrolyte to the outside can be suppressed to the minimum. Note that it may be configured that a pressure valve is provided to each of the small openings 7, 7, . . . and the pressure valves open when the internal pressure in the cap 6 becomes higher than a predetermined pressure, so that the small openings 7, 7, . . . appear.

Since the metal electrolytic capacitor explained above is capable of widely reducing an overflow of an evaporated driving electrolyte to the outside, it can be mounted on a circuit board. Thereby, a highly safe circuit board without any contamination and ignition, etc. can be obtained. Also, the circuit board above can be suitably used as a circuit board for a variety of electric devices and electronic devices.

The present invention was explained above with reference to the attached drawings, while the present invention is not limited to the embodiment above and can be modified and embodied variably. For example, as to the cap 6, other than putting it on the capacitor body 1 and fixing it with a tape, adhesive or caulking, etc., a cap 6 reaching to the base of the capacitor body 1 may be prepared and caulked at the base to fix. The absorbent or leakage prevention material 9 may be placed as a powder in the space S of the cap 6 without being wrapped in a permeable fiber material 8, such as an unwoven fabric or filter paper, or the powder may be made into a tablet. In that case, a filter paper, etc. may be provided facing to the small openings 7.

EXAMPLES

Below, the present invention will be explained further in detail with examples, etc. however the present invention is not limited to the examples, etc. below.

Reference Example 1

A commercially available aluminum electrolytic capacitor with a standard of Ø16 mm×31.5 mm, 400V and 33 μF was used and, when a power of 100V and 1A was reversely applied from a power unit to the aluminum electrolytic capacitor, the explosion-proof valve 4 of the capacitor body 1 opened and a heavy belch of a driving electrolyte, etc. was observed.

Example 1

The aluminum electrolytic capacitor of the reference example 1 was used as the capacitor body 1, and a cap 6 having a height of about 1.4 times as that of the metal case 2 of the capacitor body 1 was attached to the capacitor body 1 and fixed with a tape, so that a capacitor was obtained. At this time, the cap 6 was filled with α-cyclodextrin in an amount of 1.03 g as an absorbent 9.

When a power of 100V and 1A was reversely applied from the power unit to the capacitor, it was found that the explosion-proof valve 4 of the capacitor body 1 opened but a belch amount of the driving electrolyte, etc. was reduced to a degree of belching slightly.

Comparative Example 1

Other than not filling the cap 6 with α-cyclodextrin, a capacitor was produced in the same way as in the example 1. When a power of 100V and 1A was reversely applied from a power unit to the capacitor, a heavy belch of an evaporated driving electrolyte, etc. from the small openings 7 of the cap 6 was observed. It was found that an outflow of the driving electrolyte, etc. cannot be prevented only with the cap 6.

Example 2

Other than filling the cap 6 with a deoxycholic acid in an amount of 1.21 g, a capacitor was produced in the same way as in the example 1. When a power of 100V and 1A was reversely applied from a power unit to the capacitor, it was found that the explosion-proof valve 4 of the capacitor body 1 opened but a belch amount of the driving electrolyte, etc. was reduced to a degree of belching slightly.

Example 3

Other than filling the cap 6 with 1,1-bis(4-hydroxyphenyl) cyclohexane in an amount of 1.12 g, a capacitor was produced in the same way as in the example 1. When a power of 100V and 1A was reversely applied from a power unit to the capacitor, it was found that the explosion-proof valve 4 of the capacitor body 1 opened but a belch amount of the driving electrolyte, etc. was reduced to a degree of belching slightly.

Example 4

Other than filling the cap 6 with 1,1,2,2-tetrakis(4-hydroxyphenyl)ethane in an amount of 1.06 g, a capacitor was produced in the same way as in the example 1. When a power of 100V and 1A was reversely applied from a power unit to the capacitor, it was found that the explosion-proof valve 4 of the capacitor body 1 opened but a belch amount of the driving electrolyte, etc. was reduced to a degree of belching slightly.

Example 5

Other than filling the cap 6 with porous silica in an amount of 0.52 g, a capacitor was produced in the same way as in the example 1. When a power of 100V and 1A was reversely applied from a power unit to the capacitor, it was found that the explosion-proof valve 4 of the capacitor body 1 opened but belch amount of the driving electrolyte, etc. was reduced to a degree of belching slightly.

Example 6

Other than filling the cap 6 with porous calcium silicate in an amount of 0.25 g, a capacitor was produced in the same way as in the example 1. When a power of 100V and 1A was reversely applied from a power unit to the capacitor, it was found that the explosion-proof valve 4 of the capacitor body 1 opened but a belch amount of the driving electrolyte, etc. was reduced to a degree of belching slightly.

Example 7

Other than filling the cap 6 with porous magnesium aluminometasilicate in an amount of 1.03 g, a capacitor was produced in the same way as in the example 1. When a power of 100V and 1A was reversely applied from a power unit to the capacitor, it was found that the explosion-proof valve 4 of the capacitor body 1 opened but a belch amount of the driving electrolyte, etc. was reduced to a degree of belching slightly.

Example 8

Other than filling the cap 6 with porous alumina in an amount of 1.43 g, a capacitor was produced in the same way as in the example 1. When a power of 100V and 1A was reversely applied from a power unit to the capacitor, it was found that the explosion-proof valve 4 of the capacitor body 1 opened but a belch amount of the driving electrolyte, etc. was reduced to a degree of belching slightly.

Example 9

Other than filling the cap 6 with porous magnesium oxide in an amount of 0.67 g, a capacitor was produced in the same way as in the example 1. When a power of 100V and 1A was reversely applied from a power unit to the capacitor, it was found that the explosion-proof valve 4 of the capacitor body 1 opened but a belch amount of the driving electrolyte, etc. was reduced to a degree of belching slightly.

Example 10

Other than filling the cap 6 with porous magnesium silicate in an amount of 1.12 g, a capacitor was produced in the same way as in the example 1. When a power of 100V and 1A was reversely applied from a power unit to the capacitor, it was found that the explosion-proof valve 4 of the capacitor body 1 opened but a belch amount of the driving electrolyte, etc. was reduced to a degree of belching slightly.

Example 11

Other than filling the cap 6 with porous aluminum silicate in an amount of 1.32 g, a capacitor was produced in the same way as in the example 1. When a power of 100V and 1A was reversely applied from a power unit to the capacitor, it was found that the explosion-proof valve 4 of the capacitor body 1 opened but a belch amount of the driving electrolyte, etc. was reduced to a degree of belching slightly.

Reference Example 2

When an excess voltage of 600V and 2A was applied from a power unit to the aluminum electrolytic capacitor of the reference example 1, the explosion-proof valve 4 of the capacitor body 1 opened, and a heavy belch of the driving electrolyte, etc. was observed.

Example 12

Other than filling the cap 6 with α-cyclodextrin in an amount of 1.03 g, a capacitor was produced in the same way as in the example 1. When an excess voltage of 600V and 2A was applied from a power unit to the capacitor, it was found that the explosion-proof valve 4 of the capacitor body 1 opened but a belch amount of the driving electrolyte, etc. was reduced to a degree of belching slightly.

Comparative Example 2

Other than not filling the cap 6 with α-cyclodextrin, a capacitor was produced in the same way as in the example 12. When an excess voltage of 600V and 2A was applied from a power unit to the capacitor, a heavy belch of the evaporated driving electrolyte, etc. from the small openings 7 of the cap 6 was observed, and it was found that an overflow of the driving electrolyte, etc. could not be prevented only with the cap 6.

Example 13

Other than filling the cap 6 with deoxycholic acid in an amount of 1.21 g, a capacitor was produced in the same way as in the example 12. When an excess voltage of 600V and 2A was applied from a power unit to the capacitor, it was found that the explosion-proof valve 4 of the capacitor body 1 opened but a belch amount of the driving electrolyte, etc. was reduced to a degree of belching slightly.

Example 14

Other than filling the cap 6 with 1,1-bis(4-hydroxyphenyl) cyclohexane in an amount of 1.12 g, a capacitor was produced in the same way as in the example 12. When an excess voltage of 600V and 2A was applied from a power unit to the capacitor, it was found that the explosion-proof valve 4 of the capacitor body 1 opened but a belch amount of the driving electrolyte, etc. was reduced to a degree of belching slightly.

Example 15

Other than filling the cap 6 with 1,1,2,2-tetrakis(4-hydroxyphenyl)ethane in an amount of 1.06 g, a capacitor was produced in the same way as in the example 12. When an excess voltage of 600V and 2A was applied from a power unit to the capacitor, it was found that the explosion-proof valve 4 of the capacitor body 1 opened but a belch amount of the driving electrolyte, etc. was reduced to a degree of belching slightly.

Example 16

Other than filling the cap 6 with porous silica in an amount of 0.52 g, a capacitor was produced in the same way as in the example 12. When an excess voltage of 600V and 2A was applied from a power unit to the capacitor, it was found that the explosion-proof valve 4 of the capacitor body 1 opened but a belch amount of the driving electrolyte, etc. was reduced to a degree of belching slightly.

Example 17

Other than filling the cap 6 with porous calcium silicate in an amount of 0.25 g, a capacitor was produced in the same way as in the example 12. When an excess voltage of 600V and 2A was applied from a power unit to the capacitor, it was found that the explosion-proof valve 4 of the capacitor body 1 opened but a belch amount of the driving electrolyte, etc. was reduced to a degree of belching slightly.

Example 18

Other than filling the cap 6 with porous magnesium aluminometasilicate in an amount of 1.03 g, a capacitor was produced in the same way as in the example 12. When an excess voltage of 600V and 2A was applied from a power unit to the capacitor, it was found that the explosion-proof valve 4 of the capacitor body 1 opened but a belch amount of the driving electrolyte, etc. was reduced to a degree of belching slightly.

Example 19

Other than filling the cap 6 with porous alumina in an amount of 1.43 g, a capacitor was produced in the same way as in the example 12. When an excess voltage of 600V and 2A was applied from the power unit to the capacitor, it was found that the explosion-proof valve 4 of the capacitor body 1 opened but a belch amount of the driving electrolyte, etc. was reduced to a degree of belching slightly.

Example 20

Other than filling the cap 6 with porous magnesium oxide in an amount of 0.67 g, a capacitor was produced in the same way as in the example 12. When an excess voltage of 600V and 2A was applied from a power unit to the capacitor, it was found that the explosion-proof valve 4 of the capacitor body 1 opened but a belch amount of the driving electrolyte, etc. was reduced to a degree of belching slightly.

Example 21

Other than filling the cap 6 with porous magnesium silicate in an amount of 1.12 g, a capacitor was produced in the same way as in the example 12. When an excess voltage of 600V and 2A was applied from a power unit to the capacitor, it was found that the explosion-proof valve 4 of the capacitor body 1 opened but a belch amount of the driving electrolyte, etc. was reduced to a degree of belching slightly.

Example 22

Other than filling the cap 6 with porous aluminum silicate in an amount of 1.32 g, a capacitor was produced in the same way as in the example 12. When an excess voltage of 600V and 2A was applied from the power unit to the capacitor, it was found that the explosion-proof valve 4 of the capacitor body 1 opened but a belch amount of the driving electrolyte, etc. was reduced to a degree of belching slightly.

Example 23

The aluminum electrolytic capacitor of the reference example 1 was used as the capacitor body 1, and a cap 6 having a height of about 1.4 times as that of the metal case 2 of the capacitor body 1 was attached to the capacitor body 1 and fixed with a tape, so that a capacitor was produced. At this time, the cap 6 was filled with porous silica as an absorbent 9 in an amount of 0.42 g and magnesium sulfate.$7H_2O$ as a substance impregnated with water in an amount of 0.51 g, so that their volume ratio became 8:2.

When a power of 100V and 1A was reversely applied from a power unit to the capacitor, it was found that the explosion-proof valve 4 of the capacitor body 1 opened but a belch amount of the driving electrolyte, etc. was reduced to a degree of belching in an extremely small amount.

Comparative Example 3

Other than not filling the cap 6 with porous silica and magnesium sulfate.$7H_2O$, a capacitor was produced in the same way as in the example 23. When a power of 100V and 1A was reversely applied from a power unit to the capacitor, a heavy belch of an evaporated driving electrolyte, etc. from the small openings 7 of the cap 6 was observed, and it was found that an overflow of the driving electrolyte, etc. could not prevented by providing only the cap 6.

Comparative Example 4

Other than filling only porous silica in an amount of 0.52 g, a capacitor was produced in the same way as in the example 23. When a power of 100V and 1A was reversely applied from a power unit to the capacitor, a slight belch of an evaporated driving electrolyte, etc. from the small openings 7 of the cap 6 was observed. The amount was clearly reduced from that in the comparative example 3 explained above and a certain level of effect was obtained only by using porous silica as the absorbent, however, it was inferior to the example 23 in terms of the leakage prevention capability for the driving electrolyte, etc.

Example 24

Other than filling the cap 6 with 1,1-bis(4-hydroxyphenyl) cyclohexane as an absorbent in an amount of 0.90 g and magnesium sulfate.$7H_2O$ as a substance impregnated with water in an amount of 0.51 g, so that their volume ratio became 8:2, a capacitor was produced in the same way as in the example 23. When a power of 100V and 1A was reversely applied from a power unit to the capacitor, it was found that the explosion-proof valve 4 of the capacitor body 1 opened but a belch amount of the driving electrolyte, etc. was reduced to a degree of belching in an extremely small amount. It was found that the belch at this time was reduced from that in the case of filling the cap 6 only with 1,1-bis(4-hydroxyphenyl) cyclohexane in an amount of 1.12 g.

Example 25

Other than filling the cap 6 with porous calcium silicate as an absorbent in an amount of 0.20 g and potassium alum.12H$_2$O as a substance impregnated with water in an amount of 0.51 g, so that their volume ratio became 8:2, a capacitor was produced in the same way as in the example 23. When a power of 100V and 1A was reversely applied from a power unit to the capacitor, it was found that the explosion-proof valve 4 of the capacitor body 1 opened but a belch amount of the driving electrolyte, etc. was reduced to a degree of belching in an extremely small amount. It was found that the belch at this time was reduced from that in the case of filling the cap 6 only with porous calcium silicate in an amount of 0.25 g.

Example 26

Other than filling the cap 6 with porous magnesium aluminometasilicate as an absorbent in an amount of 0.84 g and aluminum sulfate.16H$_2$O in an amount of 0.36 g, so that their volume ratio became 8:2, a capacitor was produced in the same way as in the example 23. When a power of 100V and 1A was reversely applied from a power unit to the capacitor, it was found that the explosion-proof valve 4 of the capacitor body 1 opened but a belch amount of the driving electrolyte, etc. was reduced to a degree of belching in an extremely small amount. It was found that the belch at this time was reduced from that in the case of filling the cap 6 only with porous magnesium aluminometasilicate in an amount of 1.03 g.

Example 27

Other than filling the cap 6 with porous alumina as an absorbent in an amount of 1.14 g and nickel sulfate.6H$_2$O as a substance impregnated with water in an amount of 0.63 g, so that their volume ratio became 8:2, a capacitor was produced in the same way as in the example 23. When a power of 100V and 1A was reversely applied from a power unit to the capacitor, it was found that the explosion-proof valve 4 of the capacitor body 1 opened but a belch amount of the driving electrolyte, etc. was reduced to a degree of belching in an extremely small amount. It was found that the belch at this time was reduced from that in the case of filling the cap 6 only with porous alumina in an amount of 1.43 g.

Example 28

Other than filling the cap 6 with porous magnesium oxide as an absorbent in an amount of 0.54 g and manganese sulfate.5H$_2$O as a substance impregnated with water in an amount of 0.92 g, so that their volume ratio became 8:2, a capacitor was produced in the same way as in the example 23. When a power of 100V and 1A was reversely applied from a power unit to the capacitor, it was found that the explosion-proof valve 4 of the capacitor body 1 opened but a belch amount of the driving electrolyte, etc. was reduced to a degree of belching in an extremely small amount. It was found that the belch at this time was reduced from that in the case of filling the cap 6 only with porous magnesium oxide in an amount of 0.67 g.

Example 29

Other than filling the cap 6 with porous magnesium silicate as an absorbent in an amount of 0.90 g and iron(II) sulfate.7H$_2$O as a substance impregnated with water in an amount of 0.61 g, so that their volume ratio became 8:2, a capacitor was produced in the same way as in the example 23. When a power of 100V and 1A was reversely applied from a power unit to the capacitor, it was found that the explosion-proof valve 4 of the capacitor body 1 opened but a belch amount of the driving electrolyte, etc. was reduced to a degree of belching in an extremely small amount. It was found that the belch at this time was reduced from that in the case of filling the cap 6 only with porous magnesium silicate in an amount of 1.12 g.

Example 30

Other than filling the cap 6 with porous aluminum silicate as an absorbent in an amount of 1.01 g and iron(III) sulfate.nH$_2$O as a substance impregnated with water in an amount of 0.81 g, so that their volume ratio became 8:2, a capacitor was produced in the same way as in the example 23. When a power of 100V and 1A was reversely applied from a power unit to the capacitor, it was found that the explosion-proof valve 4 of the capacitor body 1 opened but a belch amount of the driving electrolyte, etc. was reduced to a degree of belching in an extremely small amount. It was found that the belch at this time was reduced from that in the case of filling the cap 6 only with porous aluminum silicate in an amount of 1.32 g.

Example 31

Other than filling the cap 6 with porous silica as an absorbent in an amount of 0.42 g and magnesium sulfate.7H$_2$O as a substance impregnated with water in an amount of 0.75 g, so that their volume ratio became 7:3, a capacitor was produced in the same way as in the example 23. When an excess voltage of 600V and 2A was applied from a power unit to the capacitor, it was found that the explosion-proof valve 4 of the capacitor body 1 opened but a belch amount of the driving electrolyte, etc. was reduced to a degree of belching in an extremely small amount. It was found that the belch at this time was reduced from that in the case of filling the cap 6 only with porous silica in an amount of 0.52 g.

Example 32

Other than filling the cap 6 with 1,1-bis(4-hydroxyphenyl)cyclohexane as an absorbent in an amount of 0.90 g and magnesium sulfate.7H$_2$O as a substance impregnate with water in an amount of 0.51 g, so that their volume ratio became 8:2, a capacitor was produced in the same way as in the example 31. When an excess voltage of 600V and 2A was applied from a power unit to the capacitor, it was found that the explosion-proof valve 4 of the capacitor body 1 opened but a belch amount of the driving electrolyte, etc. was reduced to a degree of belching in an extremely small amount. It was found that the belch at this time was reduced from that in the case of filling the cap 6 only with 1,1-bis(4-hydroxyphenyl)cyclohexane in an amount of 1.12 g.

Example 33

Other than filling the cap 6 with porous calcium silicate as an absorbent in an amount of 0.20 g and potassium alum.12H$_2$O as a substance impregnated with water in an amount of 0.51 g, so that their volume ratio became 8:2, a capacitor was produced in the same way as in the example 31. When an excess voltage of 600V and 2A was applied from a power unit to the capacitor, it was found that the explosion-proof valve 4 of the capacitor body 1 opened but a belch amount of the driving electrolyte, etc. was reduced to a degree of belching in an extremely small amount. It was found that the belch at this time was reduced from that in the case of filling the cap 6 only with porous calcium silicate in an amount of 0.25 g.

Example 34

Other than filling the cap 6 with porous magnesium aluminometasilicate as an absorbent in an amount of 0.84 g and aluminum sulfate.16$H_2O$ as a substance impregnated with water in an amount of 0.36 g, so that their volume ratio became 8:2, a capacitor was produced in the same way as in the example 31. When an excess voltage of 600V and 2A was applied from a power unit to the capacitor, it was found that the explosion-proof valve 4 of the capacitor body 1 opened but a belch amount of the driving electrolyte, etc. was reduced to a degree of belching in an extremely small amount. It was found that the belch at this time was reduced from that in the case of filling the cap 6 only with porous magnesium aluminometasilicate in an amount of 1.03 g.

Example 35

Other than filling the cap 6 with porous alumina as an absorbent in an amount of 1.14 g and nickel sulfate.6$H_2O$ as a substance impregnated with water in an amount of 0.63 g, so that their volume ratio became 8:2, a capacitor was produced in the same way as in the example 31. When an excess voltage of 600V and 2A was applied from a power unit to the capacitor, it was found that the explosion-proof valve 4 of the capacitor body 1 opened but a belch amount of the driving electrolyte, etc. was reduced to a degree of belching in an extremely small amount. It was found that the belch at this time was reduced from that in the case of filling the cap 6 only with porous alumina in an amount of 1.43 g.

Example 36

Other than filling the cap 6 with porous magnesium oxide as an absorbent in an amount of 0.54 g and manganese sulfate.5$H_2O$ as a substance impregnated with water in an amount of 0.92 g, so that their volume ratio became 8:2, a capacitor was produced in the same way as in the example 31. When an excess voltage of 600V and 2A was applied from a power unit to the capacitor, it was found that the explosion-proof valve 4 of the capacitor body 1 opened but a belch amount of the driving electrolyte, etc. was reduced to a degree of belching in an extremely small amount. It was found that the belch at this time was reduced from that in the case of filling the cap 6 only with porous magnesium oxide in an amount of 0.67 g.

Example 37

Other than filling the cap 6 with porous magnesium silicate as an absorbent in an amount of 0.90 g and ion(II) sulfate.7$H_2O$ as a substance impregnated with water in an amount of 0.61 g, so that their volume ratio became 8:2, a capacitor was produced in the same way as in the example 31. When an excess voltage of 600V and 2A was applied from a power unit to the capacitor, it was found that the explosion-proof valve 4 of the capacitor body 1 opened but a belch amount of the driving electrolyte, etc. was reduced to a degree of belching in an extremely small amount. It was found that the belch at this time was reduced from that in the case of filling the cap 6 only with porous magnesium silicate in an amount of 1.12 g.

Example 38

Other than filling the cap 6 with porous aluminum silicate as an absorbent in an amount of 1.01 g and ion(III) sulfate.n$H_2O$ as a substance impregnated with water in an amount of 0.81 g, so that their volume ratio became 8:2, a capacitor was produced in the same way as in the example 31. When an excess voltage of 600V and 2A was applied from a power unit to the capacitor, it was found that the explosion-proof valve 4 of the capacitor body 1 opened but a belch amount of the driving electrolyte, etc. was reduced to a degree of belching in an extremely small amount. It was found that the belch at this time was reduced from that in the case of filling the cap 6 only with porous aluminum silicate in an amount of 1.32 g.

EXPLANATION OF REFERENCE NUMBERS

1 . . . aluminum electrolytic capacitor body
2 . . . metal case
   2a . . . top panel portion
4 . . . explosion-proof valve
6 . . . cap
   6a . . . top panel portion (bottom portion)
7 . . . small opening
8 . . . permeable fiber material
9 . . . absorbent, leakage prevention material

The invention claimed is:

1. A leakage prevention material for a metal electrolytic capacitor that absorbs a driving electrolyte in the case of an electric abnormality of the metal electrolytic capacitor, the metal electrolytic capacitor comprising a capacitor element impregnated with the driving electrolyte, a metal case having a cylindrical shape with a bottom for housing the that, and a pair of leads extending from the capacitor element, wherein
the leakage prevention material is composed of an absorbent that reduces a belch amount of the driving electrolyte by forming a molecular compound with the driving electrolyte and a substance impregnated with water.

2. The leakage prevention material for a metal electrolytic capacitor as set forth in claim 1, wherein the absorbent is an organic-type, inorganic-type, or an organic and inorganic composite-type material.

3. The leakage prevention material as set forth in claim 1, wherein the absorbent is an inorganic porous material.

4. The leakage prevention material for a metal electrolytic capacitor as set forth in claim 1, wherein the substance impregnated with water is a water molecular compound.

5. A metal electrolytic capacitor, comprising:
a capacitor element impregnated with a driving electrolyte,
a pair of leads extending from the capacitor element,
a metal case having a cylindrical shape with a bottom for housing the capacitor element, the metal case including a top panel containing an explosion roof valve,
wherein the explosion prevention opens in the case of an electricity abnormality to belch a driving electrolyte, and
wherein a substance impregnated with water and an absorbent for absorbing the driving electrolyte in the case of an electric abnormality are provided above the explosion-proof valve.

6. The metal electrolytic capacitor as set forth in claim 5, wherein the absorbent is provided inside a casing attached above the explosion-proof valve.

7. The metal electrolytic capacitor as set forth in claim 6, wherein a small opening for reducing an internal pressure rise associated with belch of the driving electrolyte is formed on the casing.

8. The metal electrolytic capacitor as set forth in claim 5, wherein the absorbent reduces a belch amount of the driving electrolyte by forming a molecular compound with the driving electrolyte.

9. The metal electrolytic capacitor as set forth in claim 5, wherein the absorbent and substance impregnated with water are provided inside a casing attached above the explosion-proof valve.

10. The metal electrolytic capacitor as set forth in claim 9, wherein a small opening for reducing an internal pressure rise associated with belch of the driving electrolyte is formed on the casing.

11. The metal electrolytic capacitor as set forth in claim 10, wherein the absorbent reduces a belch amount of the driving electrolyte by forming a molecular compound with the driving electrolyte.

12. The metal electrolytic capacitor as set forth in claim 5, wherein the substance impregnated with water is a water molecular compound.

13. The leakage prevention material as set forth in claim 2 wherein the substance impregnated with water is a water molecular compound.

14. The leakage prevention material as set forth in claim 3 wherein the substance impregnated with water is a water molecular compound.

15. The metal electrolytic capacitor as set forth in claim 5, wherein the absorbent reduces a belch amount of the driving electrolyte by forming a molecular compound with the driving electrolyte, and
wherein the absorbent is an organic-type, inorganic-type, or an organic and inorganic composite-type material.

16. The metal electrolytic capacitor as set forth in claim 5, wherein the absorbent reduces a belch amount of a driving electrolyte by forming a molecular compound with the driving electrolyte, and
wherein the absorbent is an inorganic porous material.

17. The metal electrolytic capacitor as set forth in claim 15, wherein the substance impregnated with water is a water molecular compound.

18. The metal electrolytic capacitor as set forth in claim 16, wherein the substance impregnated with water is a water molecular compound.

* * * * *